US008843656B2

(12) United States Patent
Gahm et al.

(10) Patent No.: US 8,843,656 B2
(45) Date of Patent: Sep. 23, 2014

(54) SYSTEM AND METHOD FOR PREVENTING OVERESTIMATION OF AVAILABLE BANDWIDTH IN ADAPTIVE BITRATE STREAMING CLIENTS

(75) Inventors: Joshua B. Gahm, Newtonville, MA (US); Ali C. Begen, London (CA); David R. Oran, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/494,633

(22) Filed: Jun. 12, 2012

(65) Prior Publication Data

US 2013/0332623 A1    Dec. 12, 2013

(51) Int. Cl.
*G06F 15/16* (2006.01)

(52) U.S. Cl.
USPC ......................................... 709/234

(58) Field of Classification Search
USPC ......................................... 709/234
See application file for complete search history.

(56) References Cited

U.S. PATENT DOCUMENTS

| 5,978,357 | A  | * | 11/1999 | Charny         | 370/231 |
| 6,052,361 | A  | * | 4/2000  | Ansari et al.  | 370/232 |
| 6,229,789 | B1 | * | 5/2001  | Simpson et al. | 370/235 |
| 7,158,481 | B1 | * | 1/2007  | Saari          | 370/235 |
| 7,493,017 | B2 | * | 2/2009  | Adler et al.   | 386/343 |
| 8,161,158 | B2 |   | 4/2012  | Curcio et al.  |         |
| 8,351,331 | B2 |   | 1/2013  | Karagiannis    |         |
| 8,396,983 | B1 |   | 3/2013  | Inskip et al.  |         |
| 8,489,704 | B1 | * | 7/2013  | Mendez         | 709/217 |
| 2003/0156650 | A1 | * | 8/2003 | Campisano et al. | 375/240.25 |
| 2004/0098748 | A1 | * | 5/2004 | Bo et al.      | 725/105 |
| 2005/0232148 | A1 |   | 10/2005 | Curcio et al. |         |
| 2006/0143678 | A1 | * | 6/2006 | Chou et al.    | 725/118 |
| 2007/0039449 | A1 | * | 2/2007 | Redmann        | 84/609 |
| 2007/0053446 | A1 | * | 3/2007 | Spilo          | 375/259 |
| 2008/0133766 | A1 | * | 6/2008 | Luo            | 709/231 |
| 2008/0192839 | A1 |   | 8/2008 | Gahm et al.    |         |
| 2008/0259031 | A1 | * | 10/2008 | Yoshino       | 345/158 |
| 2008/0310316 | A1 |   | 12/2008 | Oran et al.   |         |
| 2009/0055580 | A1 | * | 2/2009 | Moscibroda et al. | 711/104 |
| 2009/0190474 | A1 |   | 7/2009 | Gahm et al.   |         |
| 2010/0198979 | A1 |   | 8/2010 | Pickens et al. |         |

(Continued)

FOREIGN PATENT DOCUMENTS

EP          2530885       12/2012
WO    WO2013/188137    12/2013

OTHER PUBLICATIONS

Wikipedia®, "Bufferbloat," [retrieved and printed from http://en.wikipedia.org/wiki/Bufferbloat on Jun. 12, 2012], 4 pages.

(Continued)

*Primary Examiner* — Waseem Ashraf
(74) *Attorney, Agent, or Firm* — Patent Capital Group

(57) ABSTRACT

A method is provided in one example embodiment and includes generating a bandwidth estimation for an adaptive bitrate (ABR) client; evaluating a current state of a buffer of the ABR client; and determining an encoding rate to be used for the ABR client based, at least, on the bandwidth estimation and the current state of the buffer. A fetch interval for the ABR client increases as the buffer becomes more full, while not reaching a level at which the ABR client is consuming data at a same rate at which it is downloading the data.

16 Claims, 6 Drawing Sheets

(56) References Cited

U.S. PATENT DOCUMENTS

| | | | |
|---|---|---|---|
| 2010/0254462 | A1 | 10/2010 | Friedrich et al. |
| 2010/0299552 | A1 | 11/2010 | Schlack et al. |
| 2011/0066673 | A1 | 3/2011 | Outlaw |
| 2012/0004960 | A1 | 1/2012 | Ma et al. |
| 2012/0327779 | A1 | 12/2012 | Gell et al. |
| 2013/0007263 | A1* | 1/2013 | Soroushian et al. .......... 709/224 |
| 2013/0023281 | A1* | 1/2013 | Meredith et al. ........... 455/456.1 |
| 2013/0138828 | A1 | 5/2013 | Strasman et al. |

OTHER PUBLICATIONS

B.J. Villa, et al., Improving Perceived Fairness and QoE for Adaptive Video Streams, IARIA © 2012, ISBN 978-1-61208-186-1, 10 pages.

U.S. Appl. No. 13/489,786, filed Jun. 6, 2012, entitled "Stabilization of Adaptive Streaming Video Clients Through Rate Limiting," Inventors: Joshua B. Gahm, et al.

U.S. Appl. No. 13/552,212, filed Jul. 18, 2012, entitled "System and Method for Providing Randomization in Adaptive Bitrate Streaming Environments," Inventors: Joshua B. Gahm, et al.

U.S. Appl. No. 13/661,330, filed Oct. 26, 2012, entitled "System and Method for Providing Intelligent Chunk Duration," Inventors: Jason J. Catchpole, et al.

U.S. Appl. No. 13/778,350, filed Feb. 27, 2013, entitled "TCP-Based Weighted Fair Video Delivery," Inventors: Mythili Suryanarayana Prabhu, et al.

U.S. Appl. No. 13/750,223, filed Jan. 25, 2013, entitled "System and Method for Robust Adaptation in Adaptive Streaming," Inventors: Zhi Li, et al.

U.S. Appl. No. 13/802,952, filed Mar. 14, 2013, entitled "Scheduler Based Network Virtual Player for Adaptive Bitrate Video Playback," Inventors: Siddhartha Dattagupta, et al.

U.S. Appl. No. 13/967,183, filed Aug. 14, 2013, entitled "Load Based Target Alteration in Streaming Environments," Inventors: Eric Colin Friedrich, et al.

ISO/IEC 23009-1: Dynamic Adaptive Streaming Over HTTP (DASH)—Part 1: Media presentation description and segment formats, International Standard, Apr. 1, 2012; 126 pages http://standards.iso.org/ittf/license.html.

Liu, Chengao, et al., "Rate Adaptation for Adaptive HTTP Streaming," Feb. 23, 2011, XP055077396, Abstract, Section 1 and 2.

Liu, Chenghao, et al., "Rate Adaptation for Dynamic Adaptive Streaming Over HTTP in Content Distribution Network," Signal Processing: Image Communication, vol. 27, No. 4, Oct. 10, 2011, pp. 288-311, XP055070550, ISSN: 0923-5965, DOI: 10.1016/j.image.2011.10.001, Abstract, Sections 1-6, Figure 5.

PCT Sep. 12, 2013 International Search Report and Written Opinion from International Application No. PCT/US2013/043739, May 31, 2013.

Wikipedia, the free encyclopedia, "Adaptive bitrate streaming," [retrieved and printed from the Internet Jan. 25, 2013], 8 pages; http://en.wikipedia.org/w/index.php?title=Adaptive_bitrate_streaming&oldid=534684826.

Akhshabi, Saamer, et al., "An Experimental Evaluation of Rate-Adaptive Video Players over HTTP," Signal Processing: Image Communication Apr. 1, 2012, ISSN:0923-5965.

Akhshabi, Saamer, et al., "What Happens When HTTP Adaptive Streaming Players Compete for Bandwidth?", May 2, 2012, ISBN:978-1-45-031430-5.

Houdaille, Remi, et al., "Shaping HTTP Adaptive Streams for a Better User Experience," MMSys'12 Proceedings of the 3rd Multimedia Systems Conference, Feb. 22, 2012, ISBN:978-1-45-031131-1, Abstract Only.

USPTO Dec. 19, 2013 Non-Final Office Action from U.S. Appl. No. 13/489,786.

Astuti, Davide, "Packet Handling," Seminar on Transport of Multimedia Streams in Wireless Internet, Helsinki, Finland, Aug. 29, 2003, 10 pages http://marco.uminho.pt/disciplinas/ST/st0304/packethandling.pdf.

Houdaille, Remi, et al., "Shaping HTTP Adaptive Streams for a Better User Experience," MMSys'12 Proceedings of the 3rd Multimedia Systems Conference, Feb. 22, 2012, ISBN:978-1-45-031131-1, pp. 1-9.

Jiang, Junchen et al., "Improving fairness, efficiency, and stability in HTTP-based adaptive video streaming with FESTIVE," Emerging Networking Experiments and Technologies, Dec. 10, 2012, pp. 97-108.

PCT Apr. 25, 2014 International Search Report and Written Opinion from International Application No. PCT/US2014/0011185.

PCT May 15, 2014 International Search Report and Written Opinion from International Application No. PCT/U52014/0018657.

Tian, Guibin, et al., "Towards Agile and Smooth Video Adaptation in Dynamic HTTP Streaming," Emerging Networking Experiments and Technologies, ACM, Dec. 10, 2012, pp. 109-120.

* cited by examiner

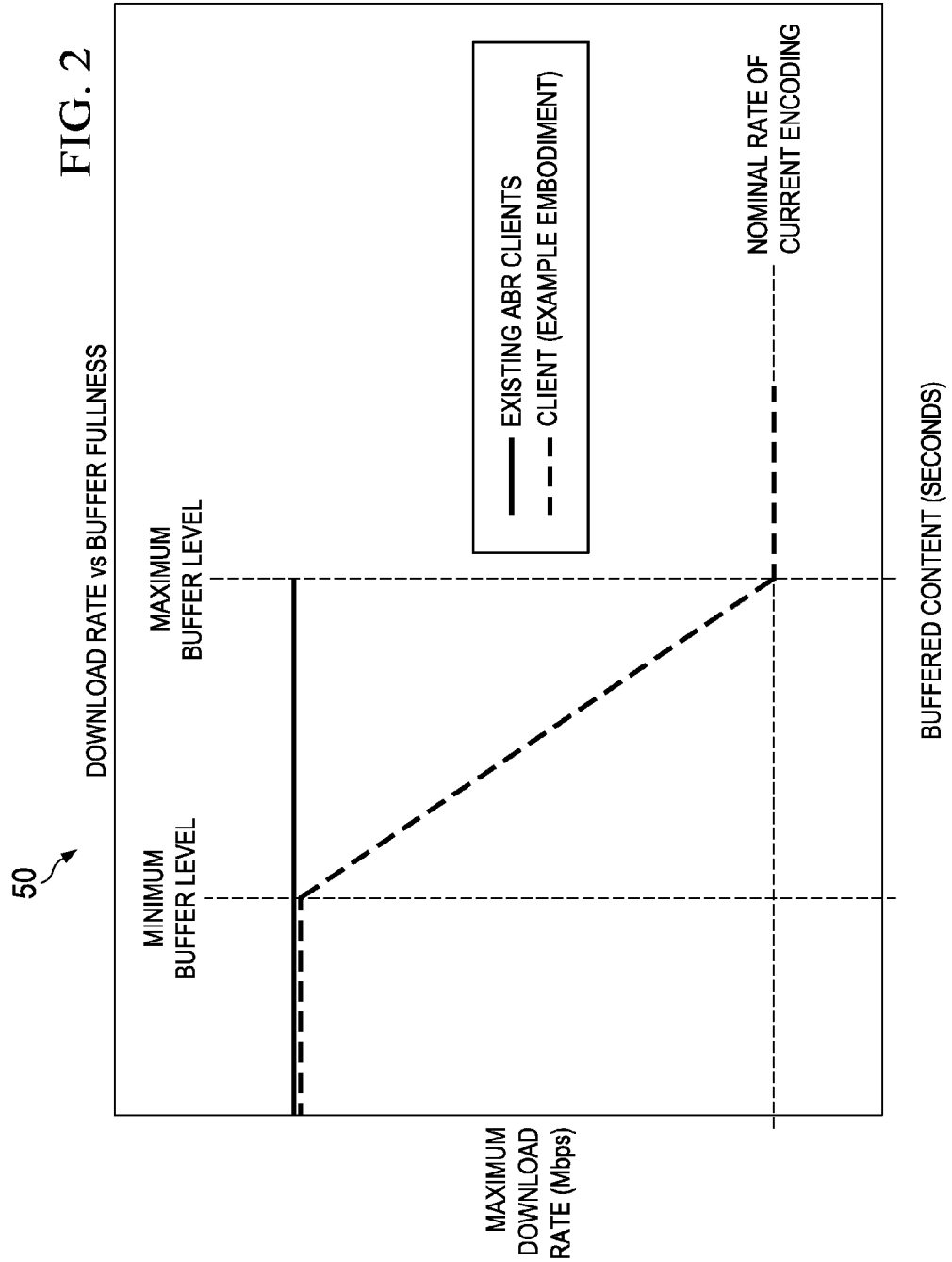

SYSTEM AND METHOD FOR PREVENTING OVERESTIMATION OF AVAILABLE BANDWIDTH IN ADAPTIVE BITRATE STREAMING CLIENTS

TECHNICAL FIELD

This disclosure relates in general to the field of communications and, more particularly, to a system and a method for preventing overestimation of available bandwidth in adaptive bitrate streaming clients.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such degradation creates frustration amongst end users, content providers, and service providers. In many instances, the video data sought for delivery is dropped, fragmented, delayed, or simply unavailable to certain end users.

Adaptive bitrate (ABR) is a technique used in streaming multimedia over computer networks. While in the past, most video streaming technologies utilized either file download, progressive file download, or custom streaming protocols, most of today's adaptive streaming technologies are based on hypertext transfer protocol (HTTP). These technologies are designed to work efficiently over large distributed HTTP networks such as the Internet.

ABR operates by detecting a user's bandwidth and CPU capacity and by adjusting the quality of a video stream accordingly. Typically, ABR leverages the use of an encoder that can encode a single source video at multiple bit-rates. The player client can switch among the different encodings depending on available resources. Ideally, the result of these activities is little buffering, fast start times, and good experiences for both high-bandwidth and low-bandwidth connections. However, there are significant challenges that remain in common problematic network scenarios, which lead clients to incorrectly adjust their video streaming by mis-estimating bandwidth.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified graph illustrating potential operations associated with one embodiment of the present disclosure;

DETAILED DESCRIPTION OF EXAMPLE EMBODIMENTS

Overview

A method is provided in one example embodiment and includes generating a bandwidth estimation for an adaptive bitrate (ABR) client; evaluating a current state of a buffer of the ABR client; and determining an encoding rate to be used for the ABR client based, at least, on the bandwidth estimation and the current state of the buffer. A fetch interval for the ABR client can increase as the buffer becomes more full, while not reaching a level at which the ABR client is consuming data at a same rate at which it is downloading the data.

The 'bandwidth estimation' can involve any characteristic, level, threshold, low or high-watermark, measurement, calculation, inference, evaluation, analysis, etc. associated with bandwidth. In more specific embodiments, the bandwidth estimation is calculated based, at least, on a number of bytes received by the ABR client divided by a time interval in which the bytes were received. In addition, the method can include selecting a subsequent encoding rate based on an average measured download rate and the current state of the buffer. The 'current state' can be associated with the fullness of the buffer, its capacity, its function, its capabilities, its real-time levels, its projected levels, its current function, etc. The method may also include defining a first buffer level for the ABR client; and defining a second buffer level for the ABR client. A function is defined for the ABR client that provides a minimum interval between successive chunk downloads based on the first and second buffer levels. Additionally, a linear interpolation can be provided from the fetch interval to an actual chunk duration as a particular level of the buffer increases from a minimum level to a maximum level.

In yet other embodiments, an instantaneous buffer level of the ABR client is inhibited from reaching the maximum level. The method could also include shifting to a higher encoding rate in order to inhibit the buffer from growing to a certain level. Alternative embodiments can include calculating a minimum fetch interval; and setting a start time for the ABR client to a current set start time plus the minimum fetch interval. Example methods could also include providing instructions to a particular network element to meter out data to the ABR client at a rate, which is determined by the ABR client. More specific example methodologies can include determining not to upshift to a higher encoding rate; and draining a transmission control protocol (TCP) buffer at a nominal play-out rate of a current encoding of the ABR client.

Example Embodiments

Figure 1A:
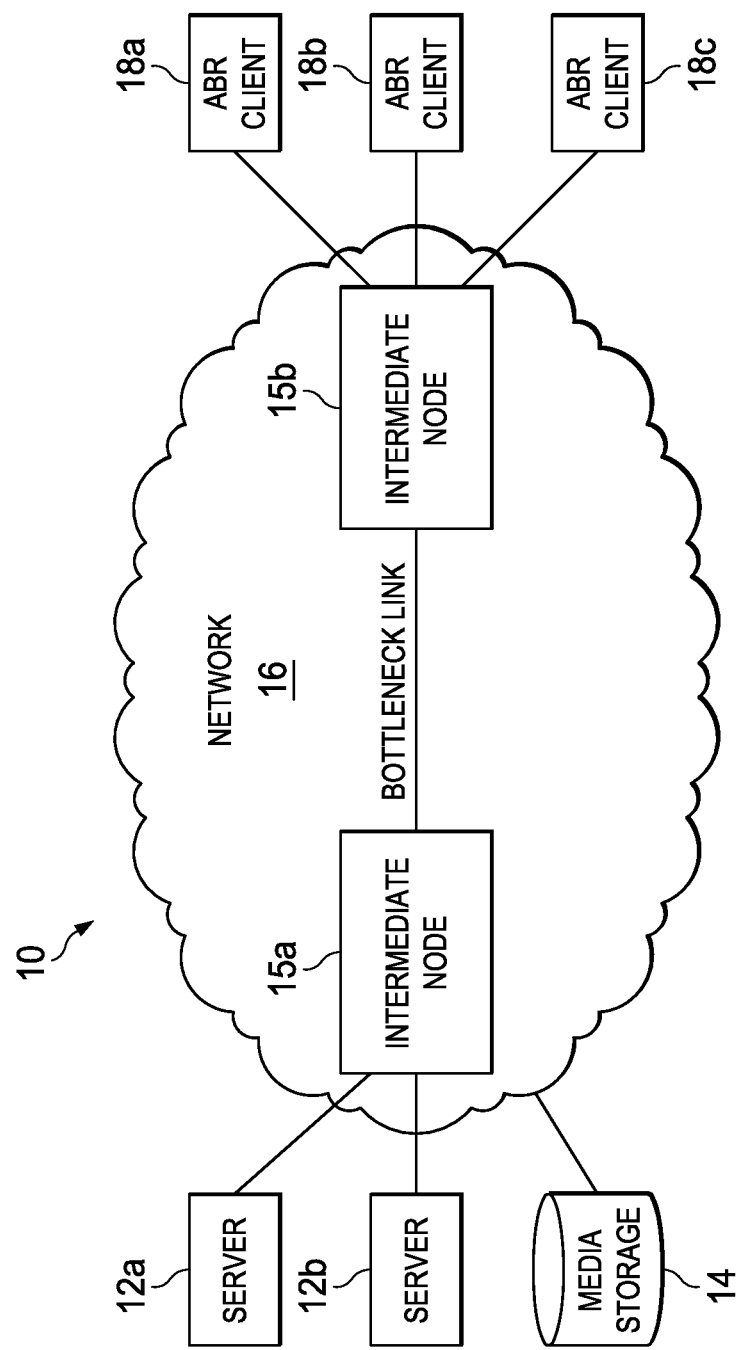
FIG. 1A is a simplified block diagram of a communication system for preventing overestimation of available bandwidth in accordance with one embodiment of the present disclosure.

Turning to FIG. 1A, FIG. 1A is a simplified block diagram of a communication system 10 configured for preventing overestimation of available bandwidth in adaptive bitrate (ABR) streaming clients in accordance with one embodiment of the present disclosure. Communication system 10 includes a plurality of servers 12$a$-$b$, a media storage 14, a network 16, a plurality of ABR clients 18$a$-$c$, and a plurality of intermediate nodes 15$a$-$b$. Servers 12$a$-$b$ are configured to deliver requested content to ABR clients 18$a$-$c$. The content may include any suitable information and/or data that can propagate in the network (e.g., video, audio, media, any type of streaming information, etc.). Certain content may be stored in media storage 14, which can be provisioned anywhere in the network. Media storage 14 may be a part of any web server, logically connected to one of servers 12*a-b*, suitably accessed using network 16, etc. In general, communication system 10 can be configured to provide downloading and streaming capabilities associated with data services. Communication system 10 can also offer the ability to manage content for mixed-media offerings, which may combine video, audio, games, applications, channels, and programs into digital media bundles.

In accordance with the techniques of the present disclosure, the architecture of FIG. 1A can offer an ABR streaming client that significantly improves performance in both managed and unmanaged network environments. In particular, when ABR clients of the present disclosure compete with each other for bandwidth at a bottleneck link, the ABR clients can do a superior job of estimating their correct, fair-share bandwidth on the link. Therefore, the ABR clients can shift rates much less frequently, along with damping the amplitude of the shifts. In general terms, the architecture can operate by systematically maintaining the bottleneck link at full utilization and, further, does this without wasting bandwidth (meaning that all the content chunks that are downloaded can be used by the ABR clients). Moreover, the architecture can sustain this full link utilization even when the available encoding rates are quantized in a way that does not permit the link bandwidth to be filled exactly with a combination of these available encoding rates. Finally, the architecture can limit the number of required rate shifts by ABR clients, for example, as allowing clients to shift rates less often than if each client were required to download chunks continuously without any gaps.

Before turning to some of the operational activities associated with the present disclosure, it is important to understand some of the challenges encountered in a network that includes ABR clients. The following foundational information may be viewed as a basis from which the present disclosure may be properly explained. Adaptive Streaming Video systems make use of multi-rate video encoding and an elastic IP transport protocol suite (typically hypertext transfer protocol/transmission control protocol/Internet protocol (HTTP/TCP/IP), but could include other transports such as HTTP/SPDY/IP, etc.) to deliver high quality streaming video to a multitude of simultaneous users under widely varying network conditions. These systems are typically employed for "over-the-top" video services, which accommodates varying quality of service over network paths.

In adaptive streaming, the source video is encoded such that the same content is available for streaming at a number of different rates (this can be via either multi-rate coding, such as H.264 AVC, or layered coding, such as H.264 SVC). The video can be divided into "chunks" of a group-of-pictures (GOP) or more; typically two (2) to ten (10) seconds of length. ABR clients can access chunks stored on servers (or produced in near-real time for "live" streaming) using a Web paradigm (e.g., HTTP GET operations over a TCP/IP transport), and depend on the reliability, congestion control, and flow control features of TCP/IP for data delivery. ABR clients can indirectly observe the performance of the streaming fetch operations by monitoring the delivery rate and/or the fill level of their buffers and, further, either upshift to a higher encoding rate to obtain better quality when bandwidth is available, or downshift in order to avoid buffer under-runs and the consequent video stalls when available bandwidth decreases.

Compared to inelastic systems such as classic cable TV or broadcast services, adaptive streaming systems use significantly larger amounts of buffering to absorb the effects of varying bandwidth from the network. They also typically operate in a "greedy" mode: competing with each other and with other network traffic to obtain as much bandwidth as they can.

In operation, ABR streaming clients typically estimate the available path bandwidth by measuring the download rate of recently fetched media chunks. When an ABR client downloads a few chunks at a rate much higher than the nominal encoding rate of the chunks, the ABR client may determine that more bandwidth is available on the path than the current encoding rate requires, and may "upshift" (i.e., decide to fetch subsequent chunks from a higher bitrate encoding, thus using more of the available link bandwidth).

Experimental data has shown that when existing ABR clients compete with each other on a bottleneck link for bandwidth, a repeating pattern can emerge where clients dramatically overestimate the available bandwidth. This causes them to upshift, only to quickly downshift again once they discover the actual available bandwidth. This repeating, oscillatory pattern is observed to be quite characteristic of most (if not all) existing ABR clients. Additionally, simulations have shown that the overestimation of available bandwidth occurs when the competing ABR clients allow the bottleneck link to become slightly "slack." The term "slack" in this disclosure includes any condition or characteristic associated with being under capacity, undersubscribed, or underutilized, as measured over a period of time. Additionally, existing ABR clients are designed in such a way that they will inevitably allow the link to become slightly undersubscribed. This leads to the aforementioned periodic overestimation of available bandwidth by each client. This overestimation of available bandwidth, in turn, is what leads to the pattern of oscillation observed in existing ABR clients. It should be noted that in some situations, the overestimation of available bandwidth may also lead to significant instability of individual clients without a readily observable macroscopic pattern of oscillation.

When referring to "slack" in those cases, the link is actually 100% utilized at most times (e.g., provided there are a few active TCP connections doing a transfer, they will quickly soak up all of the available bandwidth and build up congestion in the bottleneck link). However, if a longer time interval is considered (e.g., several seconds at least), a period of link underutilization can be observed, though this link underutilization may constitute only a fraction of a percent of the total available link capacity. Hence, the under subscription (or slack link) that matters for bandwidth overestimation is something that can happen over a period of many seconds, not just a few round-trip times (RTTs). This is different from what is typically meant by underutilization when, for example, queuing is being considered.

With an understanding that the bandwidth overestimation occurs as soon as the link becomes the slightest bit slack/undersubscribed, the transition between correct bandwidth estimation and overestimation operates as a cliff (e.g., switching from correct estimation to dramatic overestimation abruptly). The overestimation can be dramatic (e.g., as much as 3× or more with 100 ABR clients). Moreover, as the number of clients sharing the bottleneck increases, the overestimation worsens.

Hence, the problem of ABR client instability and oscillation is endemic to ABR clients as they exist today, and cannot be eliminated simply by fine-tuning adaptation algorithms or TCP behaviors. In particular, ABR client oscillations and instabilities are caused by a combination of: 1) the steady-state on/off behavior that all ABR clients exhibit; and 2) the dramatic overestimation of bandwidth that occurs when clients base their bandwidth estimates on download rates during periods when a link is less than 100% subscribed, or "slack". The key to avoiding the bandwidth estimation "cliff" as a source of instability for competing ABR clients is to identify ways that ensure the link does not move into a slack state, thus removing the second of these factors.

Consider an example that is illustrative of certain ABR client activities. In operation, existing ABR clients toggle between two modes of operation, depending on their buffer level. An ABR client uses the first mode (called "buffer-growing mode") when its content buffer is below some target level. (It is imperative to note that the buffer-growing mode should be distinguished from a similar term "buffering mode." The latter indicates a state where video is not playing out: either due to the client first starting to fetch video, or due to a "stall" induced by under-run. Moreover, the buffering mode can refer to instances in video or media applications where a receiver is growing its buffer to a safe level before the start of play-out. These terms are distinct and, further, the classic buffering mode could be generally viewed as a sub-state of the buffer-growing mode.)

When in this buffer-growing mode, a client typically fetches chunks of ABR content as rapidly as possible, beginning the fetch of the next chunk as soon as the download of the previous chunk has completed. When a client is operating in the buffer-growing mode, it uses as much network bandwidth as it can obtain, as it tries to fill its buffer as rapidly as possible. Once an ABR client's buffer has filled to some target level, the ABR client switches to a "steady state" mode.

When in the steady state mode, the ABR client can fetch content only as fast as it is being consumed by its decoder; otherwise its buffer would grow without bound. For example, if the ABR content has been encoded as 2-second chunks, then when in steady state mode, the ABR client can fetch a new chunk on average no more frequently than every 2 seconds. When a client is in the steady state mode, it does not use more bandwidth than the nominal play-out rate of the content it is downloading, even if more bandwidth is available on the link. (Note that if there is more bandwidth available on the link, then an ABR client may eventually "upshift" to a higher encoding rate. However, certain problems addressed by this disclosure are due to the ABR client's inability to accept extra bandwidth between upshifts, while it is in steady state at a particular encoding rate.)

Communication system 10 can implement the ABR client in a way that removes the sharp distinction between buffer-growing state and the steady state. To draw a comparison, an existing ABR client would accept as much bandwidth as the network can provide in the buffer-growing state and, further, would accept no more than the current play-out rate (which is equivalent to the current encoding rate except in "trick modes" such as fast forward, reverse, paused, etc.). While in steady state, an ABR client provided in the architecture of FIG. 1A would transition smoothly between these two extremes based on its buffer level.

Consider an example in which two buffer levels are defined for an ABR client (e.g., b_min and b_max, where 'b' is representative of the instantaneous buffer level of the ABR client). Typically, the buffer level for an ABR client is measured in available seconds of play-out time, not in bytes. Also, assume that the duration of each encoded ABR chunk is D seconds. A function is defined (I(b)) that gives the *minimum* interval between successive chunk downloads as:
 if (b<b_min) then I(b)=0;
 if (b>=b_max) then I(b)=D;
 otherwise, I(b)=D*(b−_min)/(b_max−b_min).

Stated in different terminology, the system linearly interpolates the fetch interval from 0 to the actual chunk duration as the buffer level increases from b_min to b_max.

One aspect of this configuration is that b should be inhibited from reaching b_max. This is because if b were ever to reach b_max, then I(b) would reach to the actual chunk duration, D, and the ABR client would begin to behave like existing ABR clients (e.g., be unwilling to accept data at even a marginally higher rate than the nominal encoding (or play-out) rate of the content). This would lead, in turn, to the slack link condition and the overestimation of available bandwidth by the ABR clients. Before detailing additional operations associated with the present disclosure, the example infrastructure is detailed below.

ABR clients 18a-c can be associated with devices, customers, or end users wishing to receive data or content in communication system 10 via some network. The term 'ABR client' is inclusive of devices used to initiate a communication, such as any type of receiver, a computer, a set-top box, an Internet radio device (IRD), a cell phone, a smart phone, a tablet, a personal digital assistant (PDA), a Google Droid, an iPhone, and iPad, or any other device, component, element, endpoint, or object capable of initiating voice, audio, video, media, or data exchanges within communication system 10. ABR clients 18a-c may also be inclusive of a suitable interface to the human user, such as a display, a keyboard, a touchpad, a remote control, or any other terminal equipment. ABR clients 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, audio, or script data, or any type of source or object code, or any other suitable information in any appropriate format that may be communicated from one point to another.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Figure 1B:
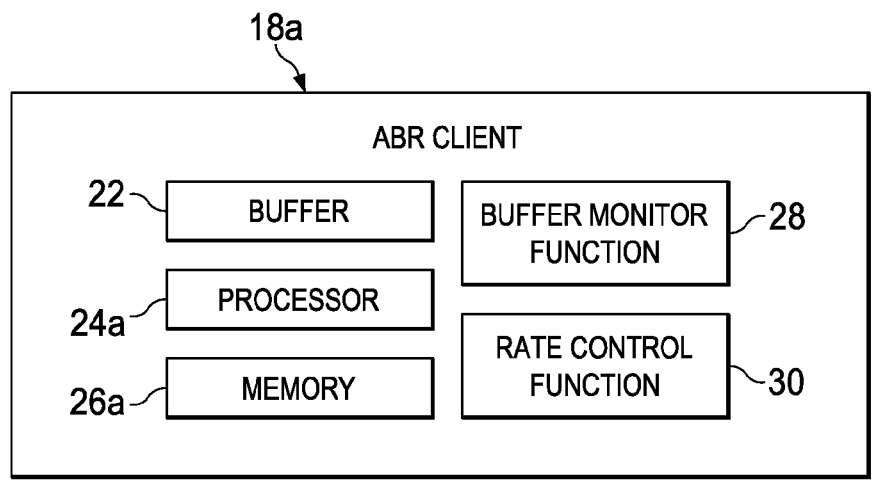
FIG. 1B is a simplified block diagram illustrating possible example details associated with one embodiment of the present disclosure.

Turning to FIG. 1B, FIG. 1B is a simplified block diagram illustrating one possible set of details associated with communication system 10. This particular configuration includes ABR client 18a being provisioned with a buffer 22, a processor 24a, a memory 26a, a buffer monitor function 28, and a rate control function 30. Buffer 22 can be configured to buffer content received at a receiver (e.g., ABR client 18a). Buffer monitor function 28 can be configured to monitor buffer 22 and determine a status of buffer 22. Rate control function 30 can be configured to monitor the state of the content stream that the receiver (e.g., ABR client 18a) is receiving and determine whether or not the content is rendering at a rate higher or lower than the rate at which the stream is being received.

Figure 1C:
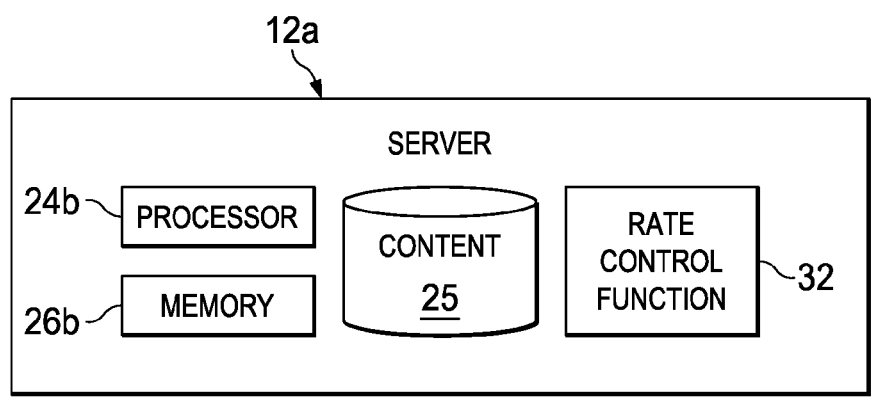
FIG. 1C is another simplified block diagram illustrating possible example details associated with one embodiment of the present disclosure.

Turning to FIG. 1C, FIG. 1C is a simplified block diagram illustrating one possible set of details associated with a given server. This particular configuration includes server 12a, which may include a processor 24b, a memory 26b, a rate control function 32, and a storage element for content 25. In one particular example, server 12a can be configured to receive instructions to meter out the data at a rate determined by the algorithm discussed herein. Hence, one alternative embodiment of the present disclosure involves a two-part solution in which server 12a and ABR client 18a are operating in concert to achieve the teachings of the present disclosure. This could involve, for example, instances of rate control function 32 and/or buffer monitor function 28 being provisioned in server 12a. Alternatively, simple messaging or signaling can be exchanged between an ABR client and these elements in order to carry out the activities discussed herein. In this sense, some of the bandwidth management operations and responsibilities can be shared amongst these devices.

In operation of an example embodiment, ABR bitrate clients tend to be less aggressive in bandwidth consumption scenarios (i.e., they utilize less bandwidth). Occasionally, the link ends up being underutilized. The problem is that even minor underutilization triggers the ABR client to (grossly) overestimate the bandwidth that is available. Operating in a group dynamic, several of the ABR clients can collectively upshift (believing that there is an abundance of readily available bandwidth). This leads to significant oscillations and client instability, as identified previously.

There are two different sorts of "rate selection" or rate management being provided in the system. In the first case, there is a rate selection function, normally performed by the ABR client, where the client decides which encoding rate to request from the server. This is the primary adaptation mechanism of ABR. In the second case, there is a special case in which, when the client cannot contemplate an upshift (e.g., because there are no higher rates in the manifest or because the client has a small screen or cannot decode a higher rate). When the client is in this state where it cannot contemplate an upshift, it should shift to a different mode where it drains its receive buffer no faster than the rate at which it is consuming the content (i.e., normally at the nominal encoding rate of the content). The reason the client should shift into this other mode in this circumstance is because the client can no longer be permitted to grow its buffer, so it cannot participate in the normal scheme where it must be willing to "swallow" more content than it really wants. It is important to note that any component can perform these functionalities (at any suitable location). Some of these possibilities are discussed below, with reference to FIG. 5.

ABR clients 18a-c and servers 12a-b are network elements that can facilitate the bandwidth management activities discussed herein. As used herein in this Specification, the term 'network element' is meant to encompass any of the aforementioned elements, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, ABR clients 18a-c and/or servers 12a-b include software to achieve (or to foster) the bandwidth management activities discussed herein. This could include the implementation of instances of buffer monitor function 28, rate control function 30, and/or rate control function 32. Additionally, each of these elements can have an internal structure (e.g., a processor, a memory element, etc.) to facilitate some of the operations described herein. In other embodiments, these bandwidth management activities may be executed externally to these elements, or included in some other network element to achieve the intended functionality. Alternatively, ABR clients 18a-c and servers 12a-b may include software (or reciprocating software) that can coordinate with other network elements in order to achieve the bandwidth management activities described herein. In still other embodiments, one or several devices may include any suitable algorithms, hardware, software, components, modules, interfaces, or objects that facilitate the operations thereof.

Figure 3:
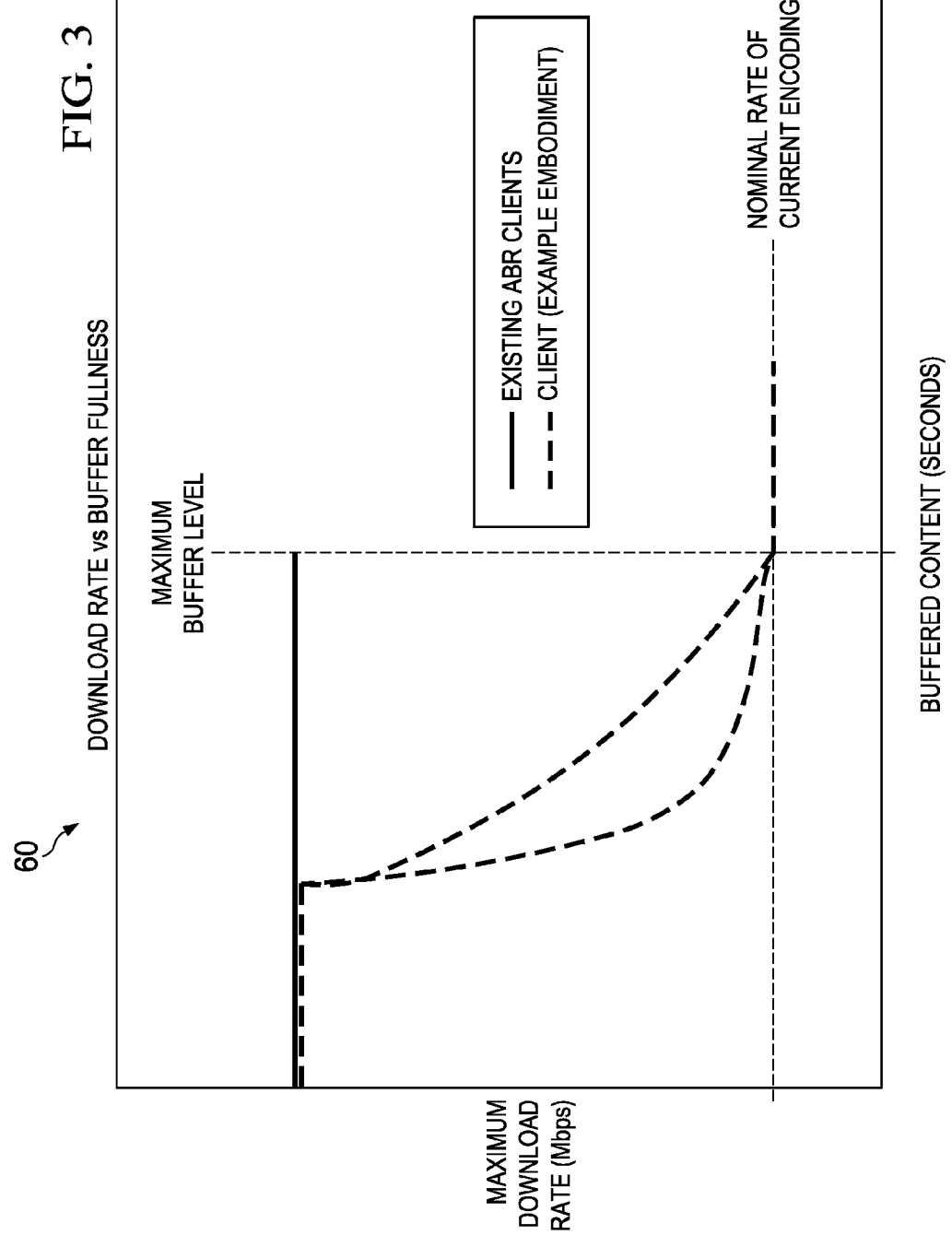
FIG. 3 is another simplified graph illustrating potential operations associated with one embodiment of the present disclosure.

Turning to FIGS. 2-3, FIGS. 2-3 are graphical illustrations (generally indicated at 50 and 60, respectively) that depict download rates vs. buffer fullness in accordance with one embodiment of the present disclosure. In one particular context, the graphs are representative of a constant function (e.g., a step function, etc.) moving left to right. In the example configuration of FIG. 2, the maximum download rate (e.g., Mbps) is provided on the y-axis, while the buffered content (e.g., seconds) is provided on the x-axis. The broken lines are representative of minimum and maximum buffer levels, where a nominal rate of current encoding is also being shown. More specifically, FIG. 2 illustrates how existing ABR clients set their maximum download rate as a function of buffer fullness, as compared with how the ABR client of the present disclosure would do accomplish this. In the example of FIG. 3, a generalized illustration of download rate vs. buffer fullness is being depicted. More specifically, the illustration of FIG. 3 attempts to show the generalization of the concepts presented herein in this Specification.

In general, one important aspect of the present disclosure involves setting the relationship between buffer fullness and the maximum download rate so that the maximum download rate decreases gradually (e.g., from as-fast-as-possible, to the currently selected encoding/play-out rate, as the buffer fullness increases). The exact form of the relationship between buffer fullness and the maximum download rate may be chosen to optimize other properties of the system.

Embodiments of communication system 10 can be highly effective for a multitude of reasons. For example, the architecture of the present disclosure can prevent groups of competing ABR clients from overestimating the available bandwidth, leading to frequent rate shifting and oscillations. First, it is fairly intuitive to understand why, when a population of ABR clients competes for bandwidth at a bottleneck link, they will tend to let the link run slack. The problem occurs because: (i) quantization of the encoding rates available to each client results in a low probability that there is a combination of selected encoding/play-out rates that would exactly use up 100% of the bandwidth of the bottleneck link; (ii) if the combination of selected rates among all the ABR clients adds up to more than the bottleneck link bandwidth, then some clients would eventually downshift to avoid a buffer underrun; and (iii) with existing ABR clients in steady state mode, no client would accept even the slightest bit more bandwidth than its currently selected encoding/play-out rate.

To give a simple example, if there are 10 clients sharing a 100 Mbps link, and assuming that the available encoding rates are 8 Mbps and 11 Mbps, then the sum of the selected rates across all the ABR clients (assuming no client is using a trick mode) can be 80 Mbps, 83 Mbps, 86 Mbps, 89 Mbps, . . . , 98 Mbps, 101 Mbps., etc. Hence, the link could be 98% or 101% subscribed, but not 100% subscribed. In addition, since the link cannot be 101% subscribed indefinitely, it would occasionally drop (at least) to a 98% subscription.

In the above description, it is important to comprehend that (in at least one instance) the link is considered to be in a slack state whenever the sum of the selected rates by all the ABR clients adds up to less than the link bandwidth. Note that because all of the ABR clients use TCP to download chunks, and since TCP operates as a greedy protocol, even though the link is undersubscribed, it will still generally have a non-zero queue. However, if looking over an interval comparable to the chunk duration, at least some periods can be identified where there is no queue (however brief).

For an ABR client as outlined herein, the slack periods on the link would be eliminated. While existing ABR clients would download no more than their currently selected encoding/play-out rate, these new clients would utilize just a bit higher download rate than their currently selected encoding/play-out rate. In the above example involving 10 clients, each client that had currently selected a rate of 8 Mbps may try to download content at up to 8.5 Mbps, while each client that had currently selected a rate of 11 Mbps (assuming there were also higher rates) would attempt to download content at 11.5 Mbps. The actual attempted download rate could depend on the buffer level of each client, but all clients would be downloading faster than their selected rates. This means that when the ABR clients had all selected rates adding up to 98 Mbps, they would in fact be willing to download bits at a rate of up to 103 Mbps, thus completely saturating the bottleneck link 100% of the time.

The next step in the analysis is to understand the relationship between link utilization and bandwidth overestimation. Even slight under-subscription of a bottleneck link (e.g. as little as 0.1%) can lead to dramatic overestimation of the fair-share bandwidth available to an ABR client. In effect, there is a "cliff" in the ability of ABR clients to estimate the available fair-share bandwidth on the link that occurs right at 100% subscription. When the link subscription is over 100%, clients rapidly converge on correct estimates of fair-share bandwidth. When the link subscription is below 100%, clients dramatically overestimate the available fair-share bandwidth. Overestimation of available bandwidth among 100 clients with 99% link subscription can be more than 3:1. When the link subscription reaches 101%, there is little or no overestimation of available fair-share bandwidth.

Finally, a last step in the analysis involves understanding why an overestimation of available fair-share bandwidth can lead to frequent rate shifting by ABR clients, and even oscillations of the system, where most clients upshift and downshift together in unison. When a group of ABR clients is oversubscribing a bottleneck link, the ABR clients obtain correct estimates of the available fair-share bandwidth on the link. Certain clients would, therefore, realize that their currently selected rate is not sustainable, and these clients may downshift. When these clients downshift, the system may then transition to the slack or undersubscribed state. In this case, clients may overestimate the available fair-share bandwidth dramatically, in which case many clients would upshift, once again leading to over-subscription of the link.

Figure 4:
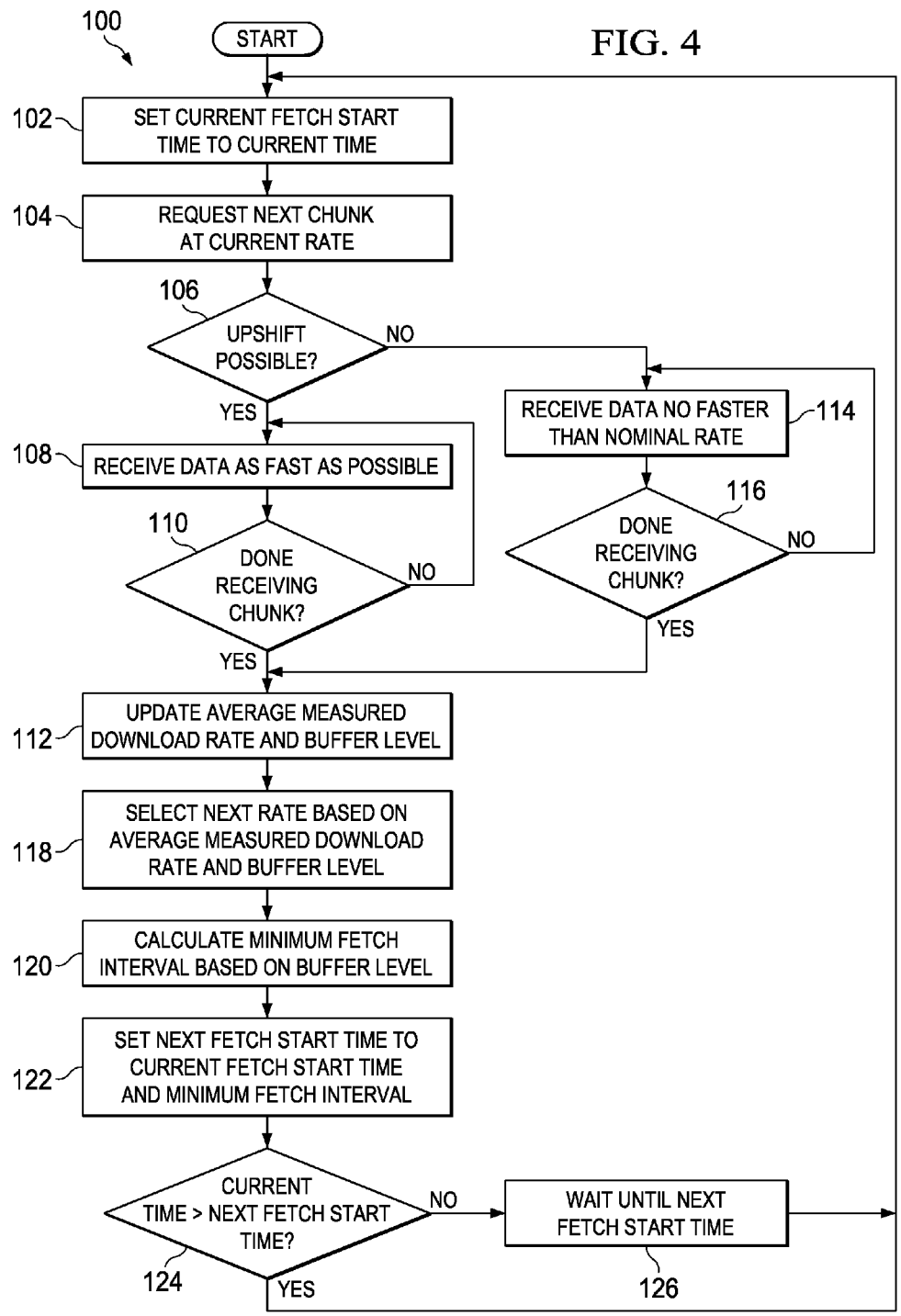
FIG. 4 is a simplified flowchart illustrating potential operations associated with the communication system in accordance with one embodiment of the present disclosure.

Turning to FIG. 4, FIG. 4 is a simplified flowchart 100 illustrating one potential set of activities associated with the present disclosure. In 102, a current fetch start time is set to the current time. Hence, after initialization, the ABR client has a currently selected bitrate and a current buffer level. At 104, a next chunk is requested at the current rate. Hence, the ABR client is requesting a next chunk of content at the currently selected bitrate.

At 106, a determination is made as to whether an upshift as possible. If it is not, then data would be received no faster than the nominal rate, as is being indicated at 114. If the answer to this inquiry is yes, then data is received as fast as possible, as it is being indicated at 108. If the chunk reception is completed (indicated generally at 110 and 116), then the average measured download rate and the buffer level is updated at 112. In sum, the ABR client is able to receive a reply to its download request, where it enters in how long it took to receive the reply. It can use the number of bytes received, divided by the time it took to receive the bytes as an estimate of the fair-share network bandwidth for that chunk request. In addition, an overall time-weighted average can be obtained by retaining some history of prior chunk downloads.

At 118, the next rate is selected based on the average measured download rate and the buffer level. At 120, the minimum fetch interval is calculated based on the buffer level. At 122, the next set start time is set to the current set start time plus the minimum fetch interval. Hence, the ABR client is using the current buffer level combined with an algorithm (e.g., provided within the ABR client, as discussed herein) to decide on how long to wait before requesting the next chunk. The ABR client waits for that amount of time, then requests the next chunk, and the loop would continue in a similar fashion. At 124, the current time is evaluated in order to determine whether it is greater than the next fetch start time. If it is, then the flow would return to 102. If the answer to this inquiry is no, then the system would wait until the next fetch start time, as generally indicated at 126.

Hence, the architecture of the present disclosure is implementing an ABR client that is inhibited from reaching a state that could allow the bottleneck link to run slack. In most cases (except for the special case where the ABR client is already fetching content at the highest available rate), the client will be willing to receive content somewhat faster than it is being consumed by the decoder. As used herein, the 'fetch interval' can include any suitable timing parameter associated with retrieving content (or, at least portions thereof). In one example, the fetch interval is being identified based on minimum and maximum values that were determined. In general terms, the fetch interval is increasing as the buffer becomes fuller, while not reaching the level at which the ABR client is consuming at the same rate at which it is downloading. In essence, the ABR client does not allow itself to get into a state where it is consuming content as fast as it is downloading the content.

As discussed in conjunction with FIG. 4, in order to prevent any ABR client from ever actually filling its buffer to b_max, two provisions can be added to the ABR client implementation. First, if a client is in a condition where it cannot contemplate an upshift to a higher rate (e.g., because there are no higher encoding rates available, or because it does not have the CPU or display power to support the higher rate), then it would drain its TCP receive buffer at exactly the nominal play-out rate of the current encoding, thus ensuring (via TCP flow control) that its TCP connection will have no off periods. (Note that clients that are in this category have no need to measure the available download bandwidth to see if additional bandwidth is available for an upshift.) Second, if a client is not in the condition described above (i.e., if it *can* contemplate an upshift), then the ABR client would perform an upshift before its buffer level reaches b_max. Stated in different terminology, a client can prevent itself from ever filling its buffer all the way by upshifting to a higher encoding rate, which will in turn mean that it will fill its buffer more slowly (measured, in program duration rather than bytes).

Now with the ABR client implemented in a way that its minimum download interval between chunks gradually increases from 0 toward the actual chunk duration, D, but without ever reaching D, every client that has not yet reached its maximum possible rate would be in a state where it is willing to accept a slightly higher download rate than the nominal play-out rate of the content it is fetching. Another way to state this is that every client is (at least to some degree) willing to grow its buffer beyond its current level at all times (unless it reaches the maximum available encoding rate). With each client willing to accept a somewhat higher download rate than its currently selected play-out rate, the link should stay at 100% utilization even when the sum of the selected encoding/play-out rates is less than 100% of the link bandwidth. Hence, when an ABR client is implemented according to the concepts presented herein in this Specification, the link could not run in the slack state: provided there is at least one client that has not reached its maximum useable encoding rate.

Figure 5:
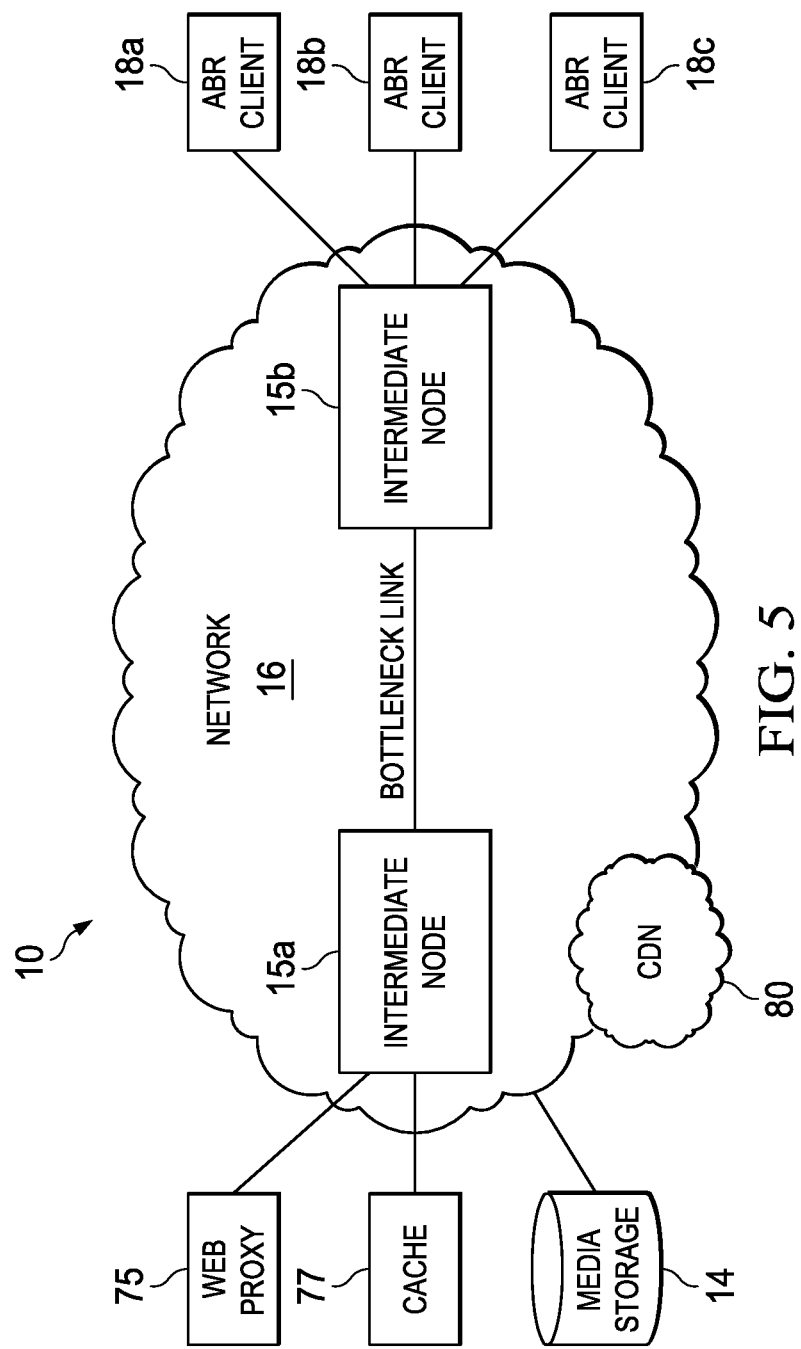
FIG. 5 is a simplified block diagram illustrating an alternative embodiment associated with the communication system.

FIG. 5 is a simplified block diagram illustrating an alternative embodiment associated with the present disclosure. In an alternative implementation, a cache 77, a web proxy 75, and/or a content delivery network (CDN) 80 can be provisioned in the middle (or at the edge) of a network and, further, operating in conjunction with the present disclosure. Additionally, these elements can be provided on either side of the bottleneck depicted in FIG. 5. Note also the ABR client itself can be embedded in any of these elements (cache 77, web proxy 75, CDN 80). In certain embodiments, these elements can be instructed to meter out the data at a rate determined by the algorithm discussed herein. Hence, the solution of the present disclosure can operate as part of a proxy server, web proxy, cache, CDN, etc. This could involve, for example, instances of rate control function 32 and/or buffer monitor function 28 being provisioned in these elements. Alternatively, simple messaging or signaling can be exchanged between an ABR client and these elements in order to carry out the activities discussed herein. In this sense, some of the bandwidth management operations can be shared amongst these devices.

In operation, CDN 80 can provide bandwidth-efficient delivery of content to ABR clients 18a-c or other endpoints, including set-top boxes, personal computers, game consoles, smartphones, tablet devices, iPads, iPhones, Google Droids, customer premises equipment, or any other suitable endpoint. Note that servers 12a-b (previously identified in FIG. 1A) may also be integrated with or coupled to an edge cache, gateway, CDN 80, or any other network element. In certain embodiments, servers 12a-b may be integrated with customer premises equipment (CPE), such as a residential gateway (RG). Content chunks may also be cached on an upstream server or cached closer to the edge of the CDN. For example, an origin server may be primed with content chunks, and a residential gateway may also fetch and cache the content chunks.

As identified previously, a network element can include software (e.g., buffer monitor function 28, rate control function 30, and/or rate control function 32, etc.) to achieve the bandwidth management operations, as outlined herein in this document. In certain example implementations, the bandwidth management functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors 24a and 24b shown in FIGS. 1B and 1C], or other similar machine, etc.). In some of these instances, a memory element [memory 26a and 26b shown in FIGS. 1B and 1C] can store data used for the operations described herein. This includes the memory element being able to store instructions (e.g., software, code, etc.) that are executed to carry out the activities described in this Specification. The processor (e.g., processors 24a and 24b) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the bandwidth management activities, as outlined herein. Additionally, each of these devices may include a processor that can execute software or an algorithm to perform the bandwidth management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for preventing overestimation of available bandwidth, comprising:
generating a bandwidth estimation for an adaptive bitrate (ABR) client configured to receive ABR encoded chunks;
evaluating a current state of a buffer of the ABR client;
determining an encoding rate to be used for the ABR client based, at least, on the bandwidth estimation and the current state of the buffer; and
determining a minimum fetch interval I(b) based on a current level of the buffer b, wherein:
I(b) is a time period the ABR client waits before fetching a next chunk having the determined encoding rate;
if b is less than the minimum level b_min, I(b) equals zero;
if b is greater than or equal to the maximum level b_max, I(b) equals to the duration of each encoded ABR chunk D; and
otherwise, I(b) is defined by a function of D*(b−b_min)/(b_max−b_min), wherein the function linearly interpolates I(b) from zero to D as b increases from b_min to b_max.

2. The method of claim 1, wherein the bandwidth estimation is calculated based, at least, on a number of bytes received by the ABR client divided by a time interval in which the bytes were received.

3. The method of claim 1, further comprising:
selecting a subsequent encoding rate based on an average measured download rate and the current state of the buffer.

4. The method of claim 1, wherein an instantaneous buffer level of the ABR client is inhibited from reaching the maximum level.

5. The method of claim 1, further comprising:
shifting to a higher encoding rate in order to inhibit the buffer from growing to a certain level.

6. The method of claim 1, further comprising:
setting a start time for the ABR client to a current set start time plus the minimum fetch interval.

7. The method of claim 1, further comprising:
providing instructions to a particular network element to meter out data to the ABR client at a rate, which is determined by the ABR client.

8. The method of claim 1, further comprising:
determining not to upshift to a higher encoding rate; and
draining a transmission control protocol (TCP) buffer at a nominal play-out rate of a current encoding of the ABR client.

9. Logic encoded in one or more non-transitory media that includes instructions for execution and when executed by a processor is operable to perform operations for preventing overestimation of available bandwidth, comprising:
generating a bandwidth estimation for an adaptive bitrate (ABR) client configured to receive ABR encoded chunks;
evaluating a current state of a buffer of the ABR client;
determining an encoding rate to be used for the ABR client based, at least, on the bandwidth estimation and the current state of the buffer; and
determining a minimum fetch interval I(b) based on a current level of the buffer b, wherein:
I(b) is a time period the ABR client waits before fetching a next chunk having the determined encoding rate;
if b is less than the minimum level b_min, I(b) equals zero;
if b is greater than or equal to the maximum level b_max, I(b) equals to the duration of each encoded ABR chunk D; and
otherwise, I(b) is defined by a function of D*(b−b_min)/(b_max−b_min), wherein the function linearly interpolates I(b) from zero to D as b increases from b_min to b_max.

10. The logic of claim 9, wherein the bandwidth estimation is calculated based, at least, on a number of bytes received by the ABR client divided by a time interval in which the bytes were received.

11. The logic of claim 9, the operations further comprising:
selecting a subsequent encoding rate based on an average measured download rate and the current state of the buffer.

12. The logic of claim 9, wherein an instantaneous buffer level of the ABR client is inhibited from reaching the maximum level.

13. The logic of claim 9, the operations further comprising:
shifting to a higher encoding rate in order to inhibit the buffer from growing to a certain level.

14. An apparatus for preventing overestimation of available bandwidth, comprising:
a memory element configured to store instructions;
a processor coupled to the memory element; and a buffer, wherein the apparatus is configured for:
generating a bandwidth estimation for an adaptive bitrate (ABR) client configured to receive ABR encoded chunks;
evaluating a current state of a buffer of the ABR client;
determining an encoding rate to be used for the ABR client based, at least, on the bandwidth estimation and the current state of the buffer; and
determining a minimum fetch interval I(b) based on a current level of the buffer b, wherein:
I(b) is a time period the ABR client waits before fetching a next chunk having the determined encoding rate;
if b is less than the minimum level b_min, I(b) equals zero;
if b is greater than or equal to the maximum level b_max, I(b) equals to the duration of each encoded ABR chunk D; and
otherwise, I(b) is defined by a function of D*(b−b_min)/(b_max−b_min), wherein the function linearly interpolates I(b) from zero to D as b increases from b_min to b_max.

15. The apparatus of claim 14, the apparatus being further configured for: shifting to a higher encoding rate in order to inhibit the buffer from growing to a certain level.

16. The apparatus of claim 14, the apparatus being further configured for:
determining not to upshift to a higher encoding rate; and
draining a transmission control protocol (TCP) buffer at a nominal play-out rate of a current encoding of the ABR client.

* * * * *

UNITED STATES PATENT AND TRADEMARK OFFICE
CERTIFICATE OF CORRECTION

PATENT NO. : 8,843,656 B2  
APPLICATION NO. : 13/494633  
DATED : September 23, 2014  
INVENTOR(S) : Joshua B. Gahm et al.

Page 1 of 1

It is certified that error appears in the above-identified patent and that said Letters Patent is hereby corrected as shown below:

In The Specification

Column 6, line 5, delete "I(b)=D*(b-_min)/(b_max-b_min)." and insert -- I(b) = D*(b-b_min)/(b_max-b_min). --, therefor.

Signed and Sealed this  
Tenth Day of February, 2015

Michelle K. Lee  
*Deputy Director of the United States Patent and Trademark Office*